US008643912B2

(12) United States Patent
Kanai et al.

(10) Patent No.: US 8,643,912 B2

(45) Date of Patent: Feb. 4, 2014

(54) DRIVING MECHANISM, FIXING DEVICE, AND IMAGE FORMING APPARATUS

(75) Inventors: Kenji Kanai, Ebina (JP); Masakatsu Eda, Ebina (JP); Tatsunori Izawa, Kanagawa (JP); Yasushi Nagata, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 145 days.

(21) Appl. No.: 13/027,948

(22) Filed: Feb. 15, 2011

(65) Prior Publication Data

US 2012/0033266 A1 Feb. 9, 2012

(30) Foreign Application Priority Data

Aug. 9, 2010 (JP) ................................ 2010-178547

(51) Int. Cl.
*H04N 1/04* (2006.01)

(52) U.S. Cl.
USPC .......................................... 358/474; 399/329

(58) Field of Classification Search
USPC .......................................... 358/474; 399/329
See application file for complete search history.

(56) References Cited

U.S. PATENT DOCUMENTS

| | | | | |
|---|---|---|---|---|
| 2003/0053830 | A1 * | 3/2003 | Hachisuka et al. | 399/329 |
| 2008/0317526 | A1 * | 12/2008 | Fujimori et al. | 399/329 |
| 2010/0046995 | A1 * | 2/2010 | Nakamura et al. | 399/328 |

FOREIGN PATENT DOCUMENTS

| | | |
|---|---|---|
| JP | 2008-020790 A | 1/2008 |

* cited by examiner

*Primary Examiner* — King Poon
*Assistant Examiner* — Andrew H Lam
(74) *Attorney, Agent, or Firm* — Sughrue Mion, PLLC

(57) ABSTRACT

A driving mechanism includes: a first contacting member that comes into contact with a contacted member; a supporting member that supports the first contacting member and is reciprocatably provided, the supporting member moving the first contacting member into contact with or retracts from the contacted member; a cam that reciprocates the supporting member; and a driving force transmission member that is provided to transmit a driving force to the cam, the driving force transmission member is engaged with the cam by transmit a first driving force, and is disengaged from the cam by a second driving force. In the driving mechanism, the second driving force is applied to the driving force transmission member after the cam is stopped in a state where the cam comes into contact with the supporting member on a small radius end of the cam.

18 Claims, 9 Drawing Sheets

DRIVING MECHANISM, FIXING DEVICE, AND IMAGE FORMING APPARATUS

CROSS-REFERENCE TO RELATED APPLICATION

This application is based on and claims priority under 35 U.S.C. 119 from Japanese Patent Application No. 2010-178547 filed on Aug. 9, 2010.

BACKGROUND

Technical Field

The present invention relates to a driving mechanism, a fixing device, and an image forming apparatus.

SUMMARY

According to an aspect of the invention, there is provided a driving mechanism including:

a first contacting member that comes into contact with a contacted member;

a supporting member that supports the first contacting member and is reciprocatably provided, the supporting member moving the first contacting member into contact with or retracting from the contacted member;

a cam that reciprocates the supporting member; and a driving force transmission member that is provided to transmit a driving force to the cam, the driving force transmission member is engaged with the cam by transmit a first driving force, and is disengaged from the cam by a second driving force, wherein the second driving force is applied to the driving force transmission member after the cam is stopped in a state where the cam comes into contact with the supporting member on a small radius end of the cam.

BRIEF DESCRIPTION OF THE DRAWINGS

Exemplary embodiments of the present invention will be described in detail based on the following figures, wherein.

DETAILED DESCRIPTION

First Exemplary Embodiment

An example of a driving mechanism, a fixing device, and an image forming apparatus related to a first exemplary embodiment of the invention will be described.

Figure 1:
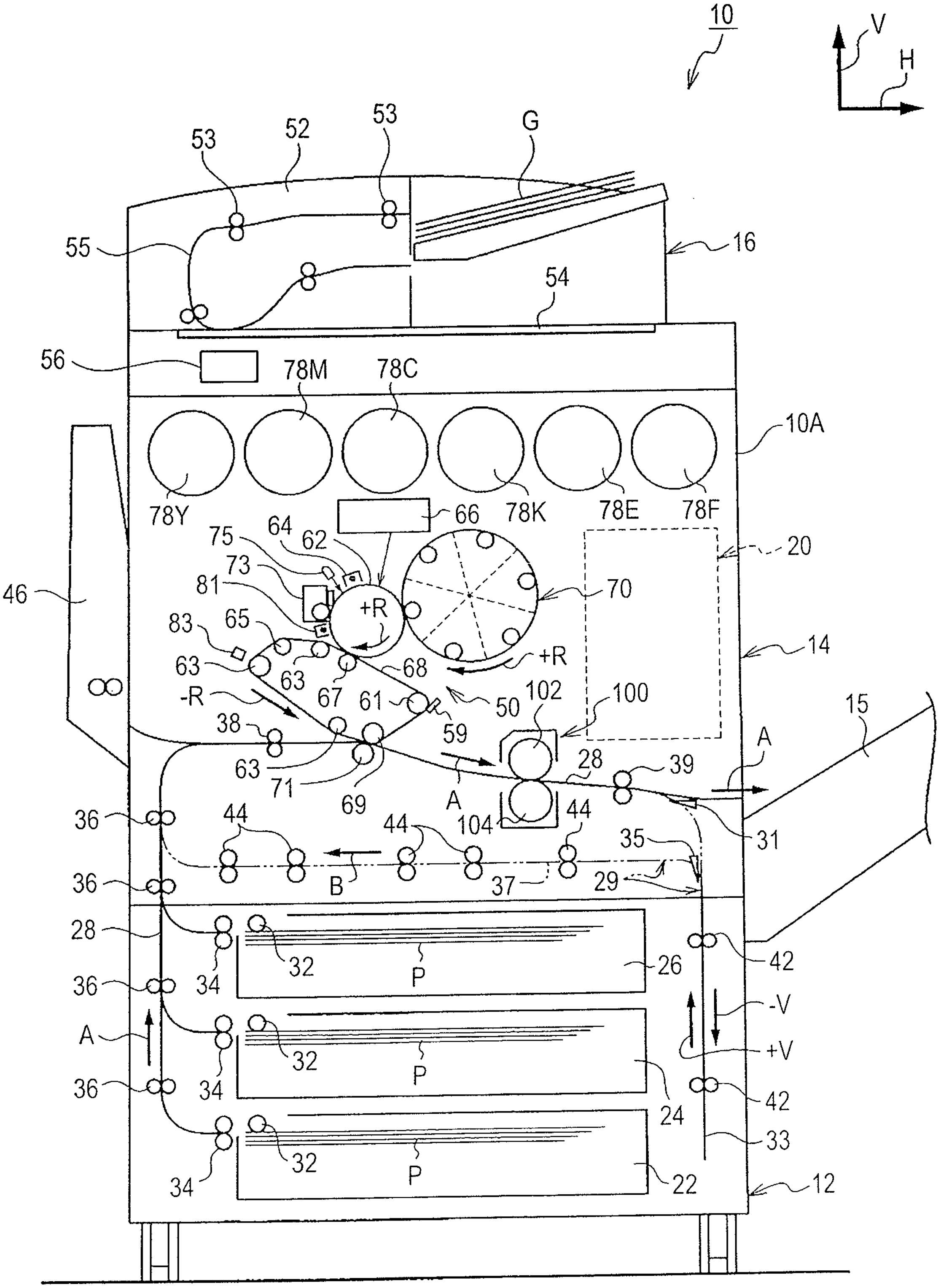
FIG. 1 is an overall configuration diagram of an image forming apparatus related to a first exemplary embodiment of the invention.

An image forming apparatus 10 as an example of the exemplary embodiment is shown in FIG. 1. The image forming apparatus 10 includes a paper supply section 12 that stores recording papers P, an image forming section 14 that forms an image on a recording paper P as an example of a recording medium that is provided on the paper supply section 12 and supplied from the paper supply section 12, a document scanning section 16 that is provided on the image forming section 14 to scan a document G, and a control section 20 that is provided within the image forming section 14 to control the operation of individual sections of the image forming apparatus 10, from the bottom toward the top in the vertical direction (the direction of an arrow V). In addition, in the following description, the vertical direction of an apparatus body 10A of the image forming apparatus 10 is described as the direction of an arrow V, and the horizontal direction is described as the direction of an arrow H.

The paper supply section 12 is provided with a first storage portion 22, a second storage portion 24, and a third storage portion 26 that store the recording papers P that are different from each other in size. In the first storage portion 22, the second storage portion 24, and the third storage portion 26, a supply roll 32 that supplies the stored recording papers P to a conveying path 28 provided within the image forming apparatus 10 is provided, and one pair of feed rolls 34 and one pair of feed rolls 36 that convey the recording papers P one by one, on the downstream side of the supply roll 32 in the conveying path 28 is provided. Additionally, an alignment roll 38, which stops a recording paper P once and delivers the recording paper to a secondary transfer position QB (refer to FIG. 2), that will be described below, at a predetermined timing, is provided on the downstream side of the feed roll 36 in the conveying direction of the recording paper P in the conveying path 28.

An upstream portion (part in which the feed roll 36 is provided) of the conveying path 28 is provided in a straight line from the left of the paper supply section 12 to a lower left portion of the image forming section 14 toward the direction of the arrow V from a front view of the image forming apparatus 10. Additionally, a downstream portion of the conveying path 28 is provided from a lower left portion of the image forming section 14 to a paper ejection section 15 provided on the right side of the image forming section 14. Moreover, in order to form images on both sides of a recording paper P, a double-sided conveying path 29 where the recording paper P is conveyed and reversed is connected to the conveying path 28.

The double-sided conveying path 29, from the front view of the image forming apparatus 10, includes a first switching member 31 that performs switching between the conveying path 28 and the double-sided conveying path 29, a reversing portion 33 that is provided in the direction (the downward direction in the drawing is −V and the upward direction in the drawing is +V) of an arrow V in the shape of a straight line from the lower right portion of the image forming section 14 to the right of the paper supply section 12, a conveying portion 37 into which the rear end of the recording paper P conveyed to the reversing portion 33 advances and is conveyed to the left in the drawing in the direction of the arrow H, and a second switching member 35 that performs switching between the reversing portion 33 and the conveying portion 37. Plural pairs of feed rolls 42 are provided in plural places at intervals in the reversing portion 33, and plural pairs of feed rolls 44 are provided in plural places at intervals in the conveying portion 37.

The first switching member 31 is a triangular prismatic member, and is adapted such that the tip portion thereof is moved to either the conveying path 28 or the double-sided conveying path 29 by a driving unit (not shown) so as to switch the conveying direction of a recording paper P. Similarly, the second switching member 35 is a triangular prismatic member from the front view, and is adapted such that the tip portion thereof is moved to either the reversing portion 33 or the conveying portion 37 by a driving unit (not shown) so as to switch the conveying direction of a recording paper P. In addition, a downstream end of the conveying portion 37 is connected to the near side of the feed roll 36 at the upstream portion of the conveying path 28 by a guide member (not shown). Additionally, a foldable manual feed portion 46 is provided on the left side of the image forming section 14, and the conveying path of a recording paper P sent from the manual feed portion 46 is connected to the near side (upstream side) of the alignment roll 38 in the conveying path 28.

The document scanning section 16 is provided with a document conveying device 52 that automatically conveys documents G one by one, a platen glass 54 that is arranged below the document conveying device 52 and has one document G placed thereon, and a scanner 56 that scans a document G conveyed by the document conveying device 52 or a document G placed on the platen glass 54.

The document conveying device 52 has an automatic conveying path 55 where plural pairs of feed rolls 53 are arranged in plural places, and a portion of the automatic conveying path 55 is arranged so that a recording paper P passes over the platen glass 54. Additionally, the scanner 56 is adapted to scan the document G conveyed by the document conveying device 52 in a state of being stationary at a left end portion of the platen glass 54, or to read the document G placed on the platen glass 54 while moving in the direction of the arrow H.

On the other hand, the image forming section 14 has an image forming unit 50 as an example of a developer image forming unit that forms a toner image (developer image) on a recording paper P. The image forming unit 50 includes a photoconductor 62, a charging member 64, an exposure device 66, a developing device 70, an intermediate transfer belt 68, and a cleaning device 73, which will be described below.

The cylindrical photoconductor 62 that is a latent image carrier is provided at the center of the apparatus body 10A in the image forming section 14. The photoconductor 62 is adapted to carry an electrostatic latent image formed by optical irradiation while rotating in the direction (clockwise direction in the drawing) of an arrow +R by a driving unit (not shown). Additionally, the corotron type charging member 64 that charges the surface of the photoconductor 62 is provided at a position where the charging member faces the outer peripheral surface of the photoconductor 62 above the photoconductor 62.

The exposure device 66 is provided at a position where the exposure device faces the outer peripheral surface of the photoconductor 62 on the downstream side of the charging member 64 in the rotational direction of the photoconductor 62. The exposure device 66 has a semiconductor laser, an f-θ lens, a polygon mirror, an imaging lens, and plural mirrors that are not shown, and is adapted to perform deflection scanning of laser beams, which are emitted from the semiconductor laser on the basis of an image signal, using the polygon mirror, and irradiate (expose) the outer peripheral surface of the photoconductor 62 charged by the charging member 64, thereby forming an electrostatic latent image. In addition, the exposure device 66 is not limited to the type in which deflection scanning of laser beams is performed by the polygon mirror, and may be a Light Emitting Diode (LED) type.

The rotation switching type developing device 70, which develops and visualizes an electrostatic latent image formed on the outer peripheral surface of the photoconductor 62 with a determined color toner, is provided on the downstream side of the part of the exposure device 66 that is irradiated with exposure light in the rotational direction of the photoconductor 62.

Figure 2:
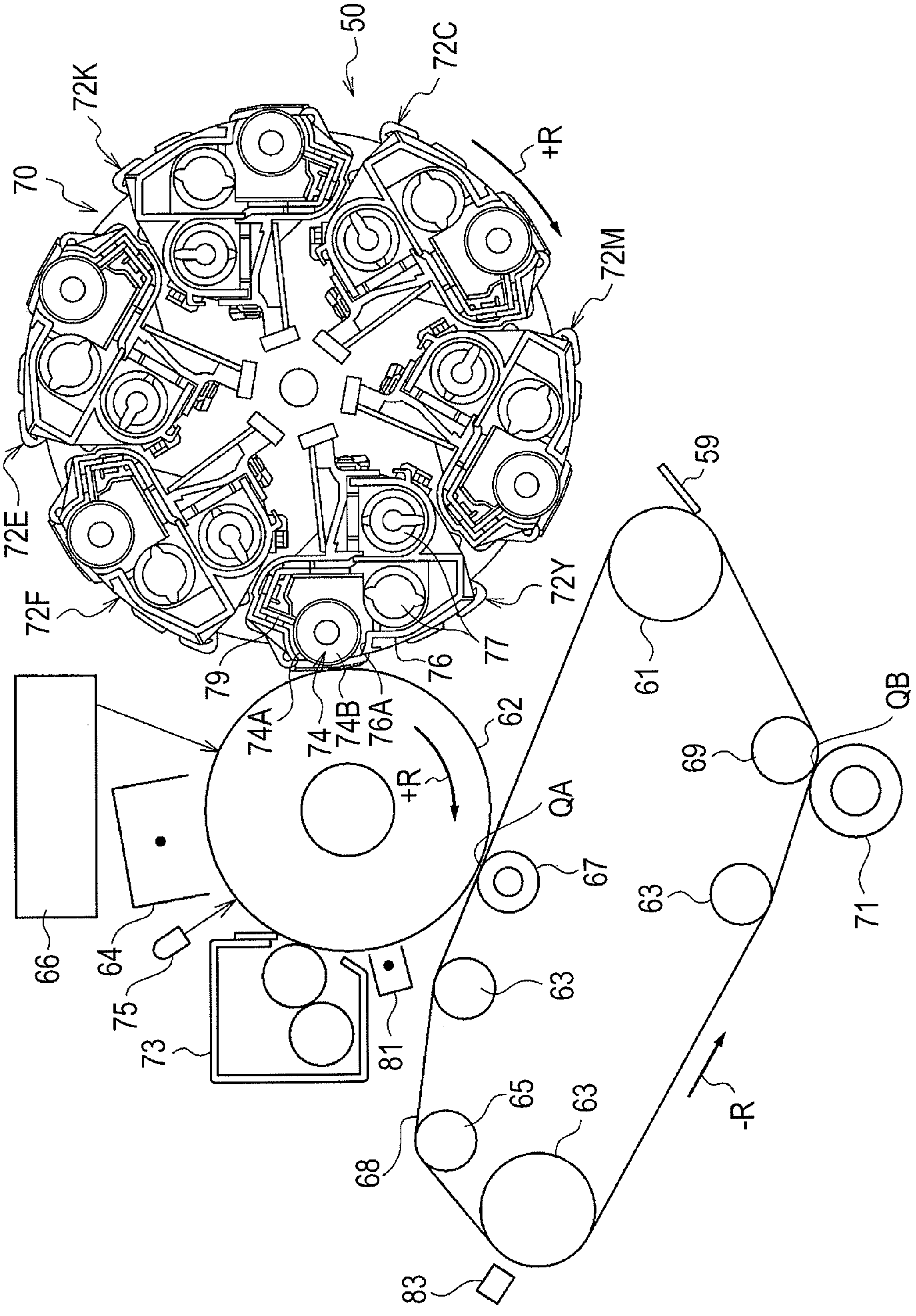
FIG. 2 is a configuration diagram of an image forming unit related to the first exemplary embodiment of the invention.

As shown in FIG. 2, in the developing device 70, developing units 72Y, 72M, 72C, 72K, 72E, and 72F corresponding to individual toner colors of yellow (Y), magenta (M), cyan (C), black (K), a first special color (E), and a second special color (F), respectively, are arranged side by side in a circumferential direction (in this order in the counterclockwise direction in the drawing), and rotate at every central angle of 60° by a motor (not shown) so that the developing units 72Y, 72M, 72C, 72K, 72E, and 72F that perform development are switched so as to face the outer peripheral surface of the photoconductor 62.

In addition, since the developing units 72Y, 72M, 72C, 72K, 72E, and 72F have the same configuration, the developing unit 72Y will be described herein, and the description of the other developing units 72M, 72C, 72K, 72E, and 72F is omitted. Additionally, in a case where image forming in the four colors of Y, M, C, and K is performed, since the developing units 72E and 72F are not used, the angle of rotation from the developing unit 72K to the developing unit 72Y becomes 180°.

The developing unit 72Y has a case member 76 that becomes a main body, and a developer (not shown) consisting of a toner and a carrier that are supplied via a toner supply passage (not shown) from a toner cartridge 78Y (refer to FIG. 1) is filled into the case member 76. Additionally, a rectangular opening 76A is formed in the case member 76 so as to face the outer peripheral surface of the photoconductor 62, and the opening 76A is provided with a developing roll 74 whose outer peripheral surface faces the outer peripheral surface of the photoconductor 62. Moreover, a plate-shaped regulating member 79 for regulating the layer thickness of the developer is provided in a part close to the opening 76A along the longitudinal direction of the opening 76A within the case member 76.

The developing roll 74 is constituted by a cylindrical developing sleeve 74A that is rotatably provided, and a magnetic member 74B consisting of plural magnetic poles fixed inside the developing sleeve 74A. As the developing sleeve 74A rotates, a magnetic brush of a developer (carrier) is formed, and as the layer thickness is regulated by the regulating member 79, a developer layer is formed on the outer peripheral surface of the developing sleeve 74A. Also, the developer layer of the outer peripheral surface of the developing sleeve 74A is conveyed to a position where the developer layer faces the photoconductor 62 by the rotation of the developing sleeve 74A, and the toner according to a latent image (electrostatic latent image) formed on the outer peripheral surface of the photoconductor 62 is made to adhere onto the latent image, thereby performing development.

Additionally, two augers 77 are rotatably arranged in parallel within the case member 76. As the two augers 77 rotate, the developer filled into the case member 76 is circulated and conveyed in the axial direction (longitudinal direction of the developing unit 72Y) of the developing roll 74. In addition, the six developing rolls 74 provided in the respective developing units 72Y, 72M, 72C, 72K, 72E, and 72F are arranged in the circumferential direction so that the spacing from the next developing roll 74 becomes a central angle of 60°, and the next developing roll 74 faces the outer peripheral surface of the photoconductor 62 by the switching of the developing unit 72.

As shown in FIG. 2, an intermediate transfer belt 68 on which a toner image formed on the outer peripheral surface of the photoconductor 62 is transferred is provided below the photoconductor 62 on the downstream side of the developing device 70 in the rotational direction of the photoconductor 62. The intermediate transfer belt 68 is an endless belt, and is wound around a driving roll 61 that is rotationally driven by the control section 20, a tension-applying roll 65 that applies tension to the intermediate transfer belt 68, plural driven rolls 63 that are driven to rotate in contact with the back of the intermediate transfer belt 68, and an auxiliary roll 69 that is driven to rotate in contact with the back of the intermediate transfer belt 68 at a secondary transfer position QB that will be described below. Also, the intermediate transfer belt 68 is adapted to move circularly in the direction (counterclockwise direction in the drawing) of an arrow −R as the driving roll 61 rotates.

Additionally, a primary transfer roll 67 that primarily transfers a toner image formed on the outer peripheral surface of the photoconductor 62 to the intermediate transfer belt 68 is provided on the opposite side of the photoconductor 62 with the intermediate transfer belt 68 interposed therebetween. The primary transfer roll 67 comes into contact with the back of the intermediate transfer belt 68 at a position apart to the downstream side in the movement direction of the intermediate transfer belt 68 from a position (this is referred to as the primary transfer position QA) where the photoconductor 62 and the intermediate transfer belt 68 come into contact with each other. Also, the primary transfer roll 67 is adapted to primarily transfer the toner image of the photoconductor 62 to the intermediate transfer belt 68 by a potential difference from the grounded photoconductor 62 as an electric current is applied thereto from a power supply (not shown).

Moreover, a secondary transfer roll 71 as an example of a transfer unit, which secondarily transfers the toner image primarily transferred onto the intermediate transfer belt 68 to a recording paper P, is provided on the opposite side of the auxiliary roll 69 with the intermediate transfer belt 68 interposed therebetween, and the position between the secondary transfer roll 71 and the auxiliary roll 69 is defined as the secondary transfer position QB where a toner image is transferred to the recording paper P. The secondary transfer roll 71 is grounded and brought into contact with the surface of the intermediate transfer belt 68, and the toner image of the intermediate transfer belt 68 is secondarily transferred to a recording paper P by a potential difference between the auxiliary roll 69 and the secondary transfer roll 71 to which an electric current is applied from a power supply (not shown). In addition, the secondary transfer position QB is set in the middle of the aforementioned conveying path 28 (refer to FIG. 1).

Additionally, a cleaning blade 59 that collects the residual toner after the secondary transfer of the intermediate transfer belt 68 is provided on the opposite side of the driving roll 61 with the intermediate transfer belt 68 interposed therebetween. The cleaning blade 59 is attached to a housing (not shown) in which an opening is formed, and the toner scraped by a tip portion of the cleaning blade 59 is collected within the housing.

A position detecting sensor 83, which detects a preset reference position on the intermediate transfer belt 68 by detecting a mark (not shown) given to the surface of the intermediate transfer belt 68 and that outputs a position detection signal that becomes a reference of a start timing of image forming processing, is provided at a position where the position detecting sensor faces the driven roll 63 around the intermediate transfer belt 68. The position detecting sensor 83 irradiates the intermediate transfer belt 68 with light and receives the light reflected on the surface of the mark so as to detect the movement position of the intermediate transfer belt 68.

On the other hand, the cleaning device 73 that cleans the residual toner that has remained on the surface of the photoconductor 62 without being primarily transferred to the intermediate transfer belt 68 is provided on the downstream side of the primary transfer roll 67 in the rotational direction of the photoconductor 62. The cleaning device 73 has a configuration in which a residual toner or the like is collected by the cleaning blade and the brush roll that come into contact with the surface of the photoconductor 62.

Additionally, a corotron 81 that performs discharging of the toner that has remained after the primary transfer to the outer peripheral surface of the photoconductor 62 is provided on the upstream side (downstream side of the primary transfer roll 67) of the cleaning device 73 in the rotational direction of the photoconductor 62. Moreover, an electric eraser 75 that irradiates the outer peripheral surface of the photoconductor 62 with light to perform discharging after cleaning, is provided on the downstream side (upstream side of the charging member 64) of the cleaning device 73 in the rotational direction of the photoconductor 62.

As shown in FIG. 1, a fixing device 100 that fixes a toner image on a recording paper P to which the toner image has been transferred by the secondary transfer roll 71 is provided on the downstream side of a paper sensor 91 in the conveying direction of the recording paper P. In addition, the fixing device 100 will be described below in detail. Additionally, a decurler 39 that corrects deformations (creases, deflections, or the like) of the recording paper P on which fixing has been performed by the fixing device 100 and flattens the recording paper is provided on the downstream side of the fixing device 100 in the conveying direction of the recording paper P.

On the other hand, above the developing device 70 below the scanner 56, toner cartridges 78Y, 78M, 78C, 78K, 78E, and 78F that store individual toners of yellow (Y), magenta (M), cyan (C), black (K), a first special color (E), and a second special color (F), respectively, are arranged side by side in the direction of the arrow H in a replaceable manner. The first special color E and the second special color F are selected from special colors other than yellow, magenta, cyan, and black (including transparency), or are not selected.

Next, the fixing device 100 will be described.

Figure 3:
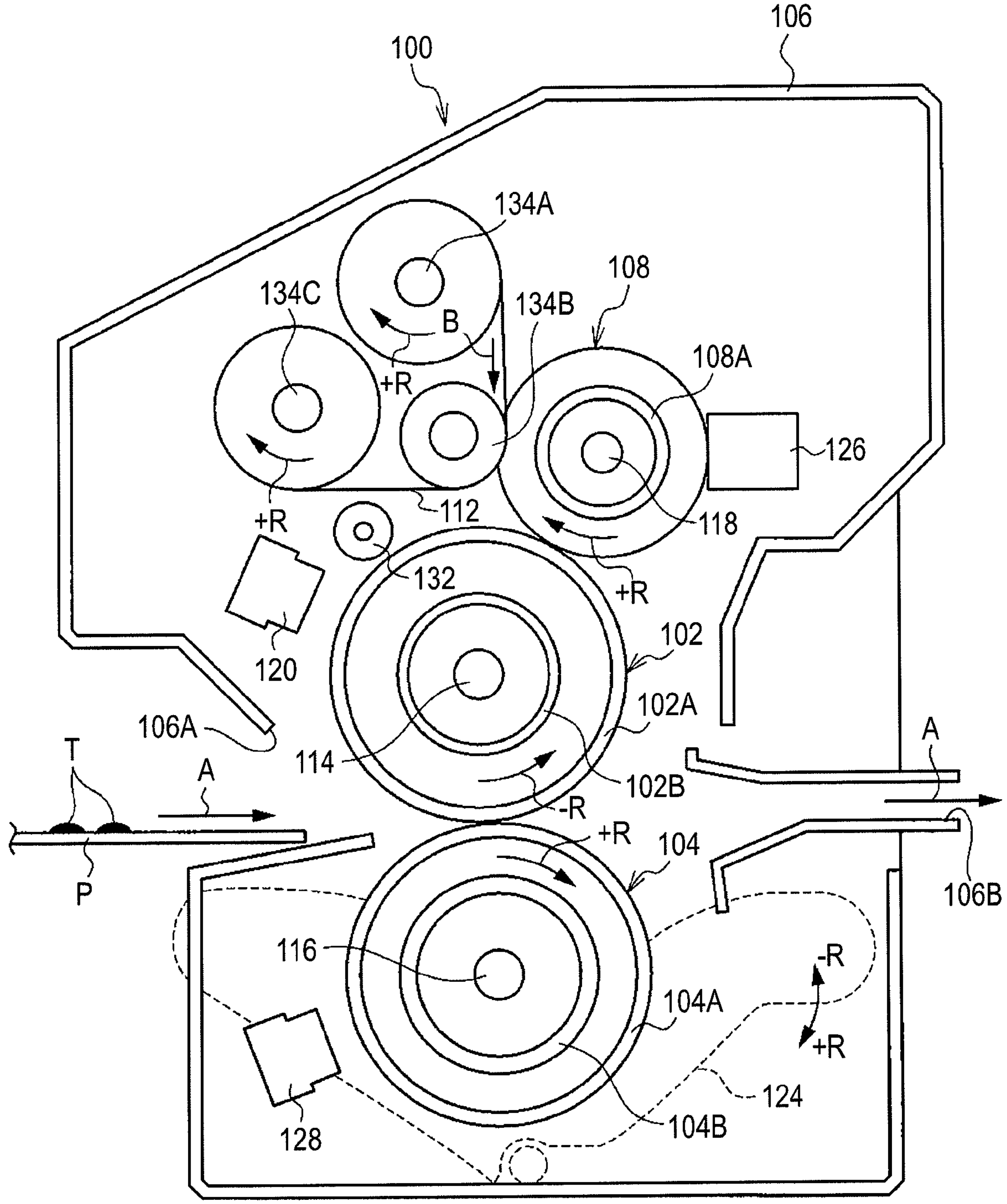
FIG. 3 is a configuration diagram of a fixing device related to the first exemplary embodiment of the invention.

As shown in FIG. 3, the fixing device 100 has a housing 106 in which an opening 106A through which a recording paper P enters, and an opening 106B through which the recording paper P is ejected are formed. A fixing roll 102 as an example of a contacted member and a fixing member that heats a toner image (developer image) to fix the toner image on a recording paper P, a pressure roll 104 that pressurizes the recording paper P along with the fixing roll 102 with the recording paper interposed therebetween, an external heating roll 108 as an example of a contacting member that contacts and heats the outer peripheral surface of the fixing roll 102, a retracting mechanism 140 (refer to FIG. 4) that moves the external heating roll 108 to the outer peripheral surface of the fixing roll 102, and a refresh roll 132 as an example of a contact member and a roughening member that are arranged on the downstream side of the external heating roll 108 in the rotational direction (direction of the arrow-R in the drawing) of the fixing roll 102 are provided as principal parts within the housing 106.

The fixing roll 102 is arranged on the side of a toner image (upper side) on the conveying path of the recording paper P. As an example, the fixing roll 102 has a configuration in which an outer periphery of a core 102B made of cylindrical aluminum is covered with an elastic member 102A made of silicone rubber, and a mold release layer (not shown) made of fluorine-based resin is formed on the outer peripheral surface of the elastic member 102A. Also, a halogen heater 114 that becomes a heat source in a non-contact state with the inner peripheral surface of the core 102B is provided inside the core 102B. The halogen heater 114 is adapted to generate heat by application of an electric current from a power supply (not shown), thereby heating the core 102B to heat the overall fixing roll 102.

A first temperature sensor 120 that detects the temperature of the fixing roll 102 is provided on the side close to the opening 106A at a position where the first temperature sensor faces the outer peripheral surface of the fixing roll 102. The first temperature sensor 120 is a non-contact-type temperature sensor, and receives the heat radiation from the fixing roll 102 by an infrared film to detect the temperature rise of this film by a thermistor so as to detect the temperature of the fixing roll 102.

The refresh roll 132 has, as an example, a configuration in which a coating material is coated on the surface of a roll made of aluminum so as to have a preset surface roughness, and is provided on the upstream side of the first temperature sensor 120 in the rotational direction (direction of the arrow −R) of the fixing roll 102. Additionally, the refresh roll 132 can be brought into contact with or retracted from the outer peripheral surface of the fixing roll 102 by a driving mechanism 160 (refer to FIG. 6) that will be described below in detail. The refresh roll 132 is retracted from the outer peripheral surface of the fixing roll 102 when not used, and is brought into contact with the outer peripheral surface of the fixing roll 102 when the number of sheets fixed has reached a preset number of sheets so as to roughen (level) the outer peripheral surface of the fixing roll.

The external heating roll 108 is made of cylindrical aluminum as an example, and cylindrical shaft portions 108A are provided at both longitudinal ends. Also, a halogen heater 118 that becomes a heat source in a non-contact state with the inner peripheral surface is provided inside the external heating roll 108. The halogen heater 118 generates heat by application of an electric current from a power supply (not shown). As an example, the external heating roll 108 performs heating so as to have a high temperature of 50° C. to 70° C. with respect to the temperature of the fixing roll 102.

Additionally, the external heating roll 108 is provided to face the outer peripheral surface of the fixing roll 102 on the upstream side of the refresh roll 132 in the direction of the arrow −R, and is moved by the operation of the retracting mechanism 140 (refer to FIG. 4) that will be described below so as to be capable of being brought into contact with the outer peripheral surface of the fixing roll 102 and retracted from the outer peripheral surface thereof. Moreover, a contact-type second temperature sensor 126 that detects the temperature of the external heating roll 108, and a web 112 that cleans the outer peripheral surface of the external heating roll 108 are provided in contact with the outer peripheral surface of the external heating roll 108.

The web 112 is made of fibers. The oil that becomes the lubricant for reducing the frictional force caused by the contact with the external heating roll 108 is impregnated in advance onto the web, and the web is wound around a shaft portion 134A rotatably provided in the direction of the arrow +R. Also, an intermediate roll 134B is rotatably arranged below the shaft portion 134A, and a shaft portion 134C that is made rotatable in the direction of the arrow +R is arranged on the left of the intermediate roll 134B with the spacing from the intermediate roll 134B.

Here, the web 112 is wound around the outer peripheral surface of the intermediate roll 134B while being wound out from the shaft portion 134A, and is wound around the shaft portion 134C as the tip thereof is fixed to the shaft portion 134C. Also, as the shaft portion 134C is rotationally driven in the direction of the arrow +R by a motor (not shown), the web 112 moves in the direction of the arrow B, comes into contact with the outer peripheral surface of the external heating roll 108, and is wound around the shaft portion 134C. In addition, the web 112 is wound around if needed during the fixing operation of the fixing device 100.

On the other hand, the pressure roll 104 is arranged below the fixing roll 102 on the conveying path of the recording paper P. As an example, the pressure roll 104 has a configuration in which an outer periphery of a core 104B made of cylindrical aluminum is covered with an elastic member 104A made of silicone rubber, and a mold release layer (not shown) made of fluorine-based resin is formed on the outer peripheral surface of the elastic member 104A. Also, a halogen heater 116 that becomes a heat source in a non-contact state with the inner peripheral surface of the core 104B is provided inside the core bar. The halogen heater 116 is adapted to generate heat by application of an electric current from a power supply (not shown), thereby heating the core 104B to heat the overall pressure roll 104.

Additionally, a third temperature sensor 128 that detects the temperature of the pressure roll 104 is provided in a non-contact state with the pressure roll 104 on the side close to the opening 106A at a position where the third temperature sensor faces the outer peripheral surface of the pressure roll 104. The third temperature sensor 128 has the same configuration as the first temperature sensor 120. Here, the first temperature sensor 120, the second temperature sensor 126, and the third temperature sensor 128 are connected to the aforementioned control section 20 (refer to FIG. 1), and the control section 20 is adapted to perform output to the halogen heaters 114, 118, and 116 on the basis of the input from the first temperature sensor 120, the second temperature sensor 126, and the third temperature sensor 128.

Moreover, bearings (not shown) are provided at both ends of the pressure roll 104, and each bearing is attached to a central portion of a V-shaped bracket 124. Also, the bracket 124 is provided so as to be rockable in the direction of the arrow +R or the direction of the arrow −R by the operation of a driving mechanism (equivalent to a driving mechanism 170 (refer to FIG. 9) in a second exemplary embodiment) that is not shown. Thereby, the pressure roll 104 is adapted to come into contact with the fixing roll 102 as the bracket 124 moves in the direction of the arrow −R, and separates from the fixing roll 102 as the bracket 124 moves in the direction of the arrow +R.

Next, the retracting mechanism 140 of the external heating roll 108 will be described.

Figure 4:
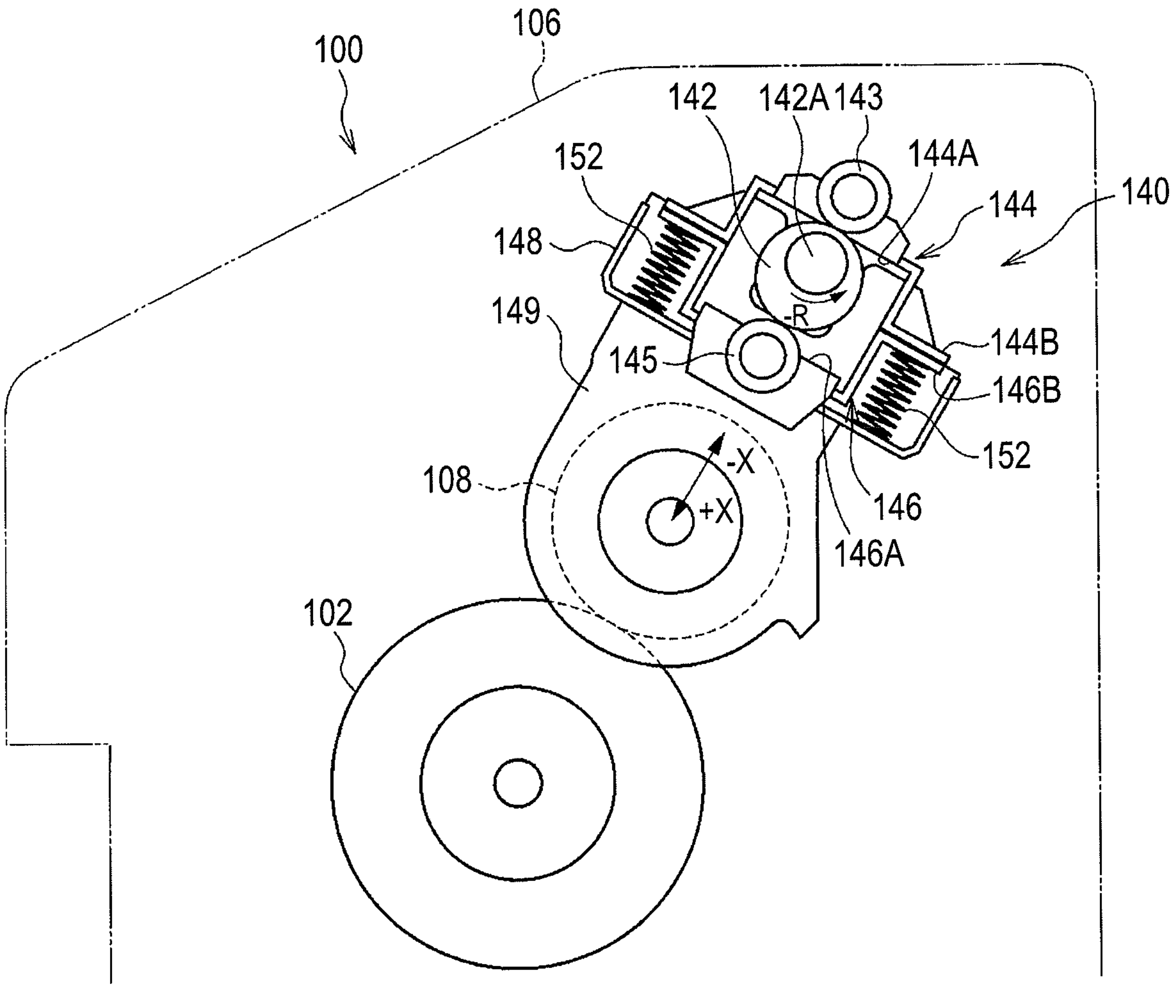
FIG. 4 is an explanatory diagram showing a retracting mechanism of an external heating roll related to the first exemplary embodiment of the invention.

As shown in FIG. 4, the retracting mechanism 140 includes an eccentric cam 142, an upper bracket 144, and a lower bracket 146 that are arranged to face each other so as to nip the eccentric cam 142, a supporting bracket 149 that has a flange 148 arranged to face the lower bracket 146 and supports both axial ends of the external heating roll 108, and plural springs 152 having one end attached to the lower bracket 146 and the other end attached to the flange 148. In addition, in the following description, the direction in which the external heating roll 108 approaches the fixing roll 102 is described as the +X direction and the direction in which the external heating roll 108 separates from the fixing roll 102 is described as the −X direction. The +X direction and the −X direction are a positive slope direction in the drawing.

The eccentric cam 142 has a rotating shaft 142A with the same axial direction as the axial direction of the external heating roll 108, and is adapted to be rotationally driven in the direction (clockwise direction in the drawing) of the arrow +R or the direction (counterclockwise direction in the drawing) of the arrow −R by a motor 150 (refer to FIG. 6) that is driven by the control section 20 (refer to FIG. 1).

The upper bracket 144 is formed with a concave 144A whose center has a U-shaped cross-section as seen in the axial direction of the external heating roll 108, and a flat portion 144B is formed toward the outside (outside in the direction intersecting the direction of the arrow X) from the peripheral edge portion of the concave 144A. Additionally, the upper bracket 144 is arranged closer to the −X direction side than the eccentric cam 142, and the opening side of the concave 144A is arranged to face the eccentric cam 142. Moreover, the upper bracket 144 is provided with an upper follower 143 that is rotatably provided in the concave 144A, and rotates by coming into contact with the outer peripheral surface of the eccentric cam 142.

The lower bracket 146 is formed with a concave 146A whose center has a U-shaped cross-section as seen in the axial direction of the external heating roll 108, and a flat portion 146B is formed toward the outside (outside in the direction intersecting the direction of the arrow X) from the peripheral edge portion of the concave 146A. Additionally, the lower bracket 146 is arranged closer to the +X direction side than the eccentric cam 142, and the opening side of the concave 146A is arranged to face the eccentric cam 142. Moreover, the lower bracket 146 is provided with a lower follower 145 that is rotatably provided in the concave 146A, and rotates by coming into contact with the outer peripheral surface of the eccentric cam 142.

Here, the upper bracket 144 and the lower bracket 146 are fastened to each other with bolts and nuts (not shown) in a state where the flat portion 144B and the flat portion 146B have contacted each other so as to nip the eccentric cam 142 with the concave 144A and the concave 146A. Also, the center of rotation of the eccentric cam 142, the center of rotation of the upper follower 143, and the center of rotation of the lower follower 145 are arranged so as to be on the same line in the direction of the arrow X. In addition, the movement direction of the upper bracket 144 and the lower bracket 146 is regulated only in the +X direction, and the −X direction by a guide member (not shown).

On the other hand, a bearing (not shown) is attached to the supporting bracket 149, and the external heating roll 108 is rotatably supported by this bearing. In addition, although one pair of supporting brackets 149 are provided at both ends of the external heating roll 108, only one supporting bracket is shown and described herein. In addition, the movement direction of the supporting bracket 149 is regulated only in the +X direction, and the −X direction by a guide member (not shown).

Moreover, the flange 148 of the supporting bracket 149 is formed so as to protrude in the axial direction of the external heating roll 108 from the supporting bracket 149, and has a U-shaped cross-section as seen in the axial direction of the external heating roll 108. Additionally, the flange 148 is arranged so that the opening side thereof is directed to the lower bracket 146. In addition, the springs 152 have one end fixed to the flat portion 146B of the lower bracket 146 and the other end fixed to the flat portion 148A of the flange 148 with the direction of the arrow X as an extension and contraction direction.

Here, in the retracting mechanism 140, the springs 152 moving the flange 148 in the +X direction when the eccentric cam 142 and the lower follower 145 come into contact with each other and the upper bracket 144 and the lower bracket 146 move in the +X direction. Thereby, the supporting bracket 149 moves in the +X direction, and the external heating roll 108 comes into contact with the outer peripheral surface of the fixing roll 102. On the other hand, when the eccentric cam 142 and the upper follower 143 come into contact with each other and the upper bracket 144 and the lower bracket 146 move in the −X direction, a force acts in a direction in which the springs 152 contract, and the flange 148 is pulled in the −X direction. Thereby, the supporting bracket 149 moves in the −X direction, and the external heating roll 108 separates (retracts) from the outer peripheral surface of the fixing roll 102. That is, the retracting mechanism 140 is adapted to switch the state of the external heating roll 108 in contact or non-contact (retraction) with the fixing roll 102.

Next, the driving mechanism 160 of the refresh roll 132 will be described.

Figure 5:
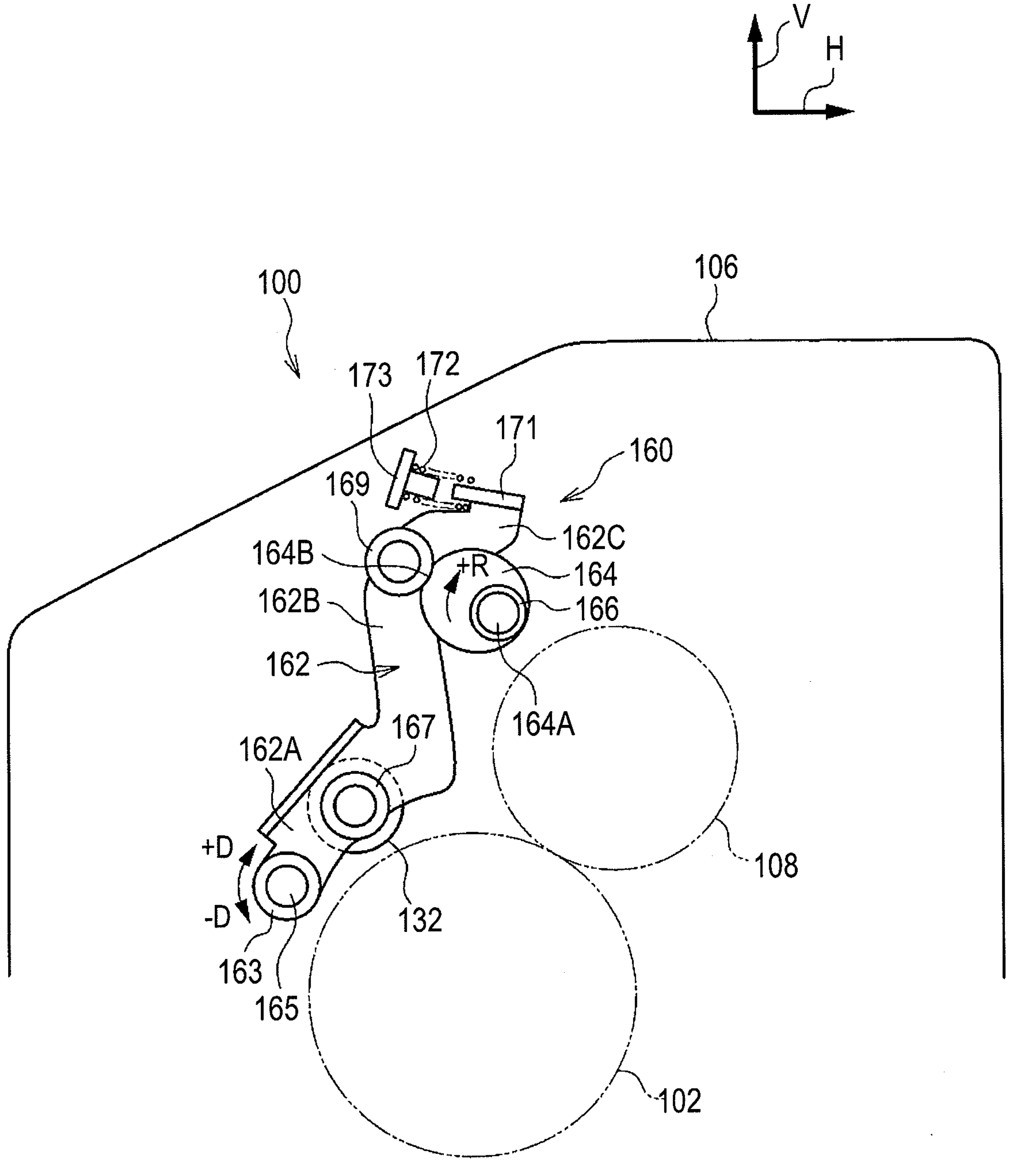
FIG. 5 is an explanatory diagram showing a driving mechanism of a refresh roll related to the first exemplary embodiment of the invention.

The driving mechanism 160 of the refresh roll 132 is shown in FIG. 5. The driving mechanism 160 includes the refresh roll 132 described above is brought into contact with or retracted from the fixing roll 102, a supporting lever 162 as an example of a supporting member that supports the refresh roll 132, a cam 164 that reciprocates the supporting lever 162 in a direction (direction in which the refresh roll 132 comes into contact with the fixing roll 102) of an arrow +D or a direction (direction in which the refresh roll 132 retracts from the outer peripheral surface of the fixing roll 102) of an arrow −D, and a one-way clutch 166 as an example of a driving force transmission member that is provided in a rotating shaft 164A (an example of the driving force transmission path to the cam 164) of the cam 164 and is engaged by a driving force to transmit this driving force to the cam 164.

The supporting lever 162 is made of a metal sheet, and has a shape such that a first lever portion 162A that extends in an positive slope direction in the drawing, a second lever portion 162B that is bent at an upper end of the first lever portion 162A, and extends in the direction of the arrow V, and a third lever portion 162C that is bent at an upper beam of the second lever portion 162B, and extends in the direction of the arrow H, are integrated.

A bearing 163 is attached to the lower end side of the first lever portion 162A in the drawing, and a rotating shaft 165 fixed to the housing 106 via the bracket (not shown) is inserted through this bearing 163. Also, the rotating shaft 165 is arranged so as to have the same axial direction as the axial direction of the fixing roll 102. Thereby, the supporting lever 162 can reciprocate in the direction of the arrow +D or the direction of the arrow −D in the drawing. Additionally, a bearing 167 is attached to the center of the first lever portion 162A, and the bearing 167 rotatably supports both ends of the refresh roll 132.

On the other hand, a follower 169 that forms a portion of the supporting lever 162 is rotatably attached to a bent portion from the second lever portion 162B to the third lever portion 162C. Additionally, an upper end of the third lever portion 162C is formed with a hooking portion 171 as a portion thereof is cut out and bent. Moreover, a fixing portion 173 for fixing one end of a spring 172 is provided within the housing 106 in the movement direction of the hooking portion 171 when the supporting lever 162 moves in the direction of the arrow −D. Here, as one end of the spring 172 is fixed to the fixing portion 173 and the other end of the spring is hooked on the hooking portion 171, the supporting lever 162 is moved in the direction of the arrow +D, in other words, the direction in which the refresh roll 132 comes into contact with the fixing roll 102. In addition, as an example, the pressurizing force that the spring 172 pushes the supporting lever 162 and the refresh roll 132 pressurizes the fixing roll 102 is set to about ⅓ of the pressurizing force that the springs 152 of the retracting mechanism 140 (refer to FIG. 4) pushes the flange 148 and the external heating roll 108 pressurizes the fixing roll 102.

The cam 164 is an elliptical eccentric cam that is provided so as to be rotatable about the rotating shaft 164A, and the part of the cam with the largest eccentricity at an outer periphery thereof is formed with a concave 164B of a curvature matched with the curvature of the follower 169. Additionally, the cam 164 is adapted to rotate in the direction of the arrow +R by the driving force of the motor 150 (refer to FIG. 6). Also, the cam 164 is adapted to rotate while coming into contact with the follower 169 as one end of the supporting lever 162 is pushed by the spring 172.

Here, the supporting lever 162 reciprocates in the direction of the arrow +D or the direction of the arrow −D about the rotating shaft 165 as the cam 164 rotates in the direction of the arrow +R. Also, when the cam 164 is located at a position where the concave 164B and the outer periphery of the follower 169 come into contact with each other, the refresh roll 132 is brought into the state of being retracted from the outer periphery of the fixing roll 102. When the part of the cam on the side opposite to the concave 164B comes into contact with the follower 169, the refresh roll 132 comes into contact with the outer periphery of the fixing roll 102.

On the other hand, the one-way clutch 166 is integrated with a driving gear 174 (refer to FIG. 6) that will be described below, and is provided in the rotating shaft 164A as the rotating shaft 164A of the cam 164 is inserted therethrough. Additionally, the one-way clutch 166 is engaged by the driving force in the direction of the arrow +R transmitted from the motor 150 (refer to FIG. 6), thereby transmits this driving force to the cam 164, and is adapted so as to be released by the driving force in the direction (opposite direction) of the arrow −R so as to block the transmission of the driving force to the cam 164.

Next, the transmission of the driving force of the refresh roll 132 and the external heating roll 108 will be described.

Figure 6:
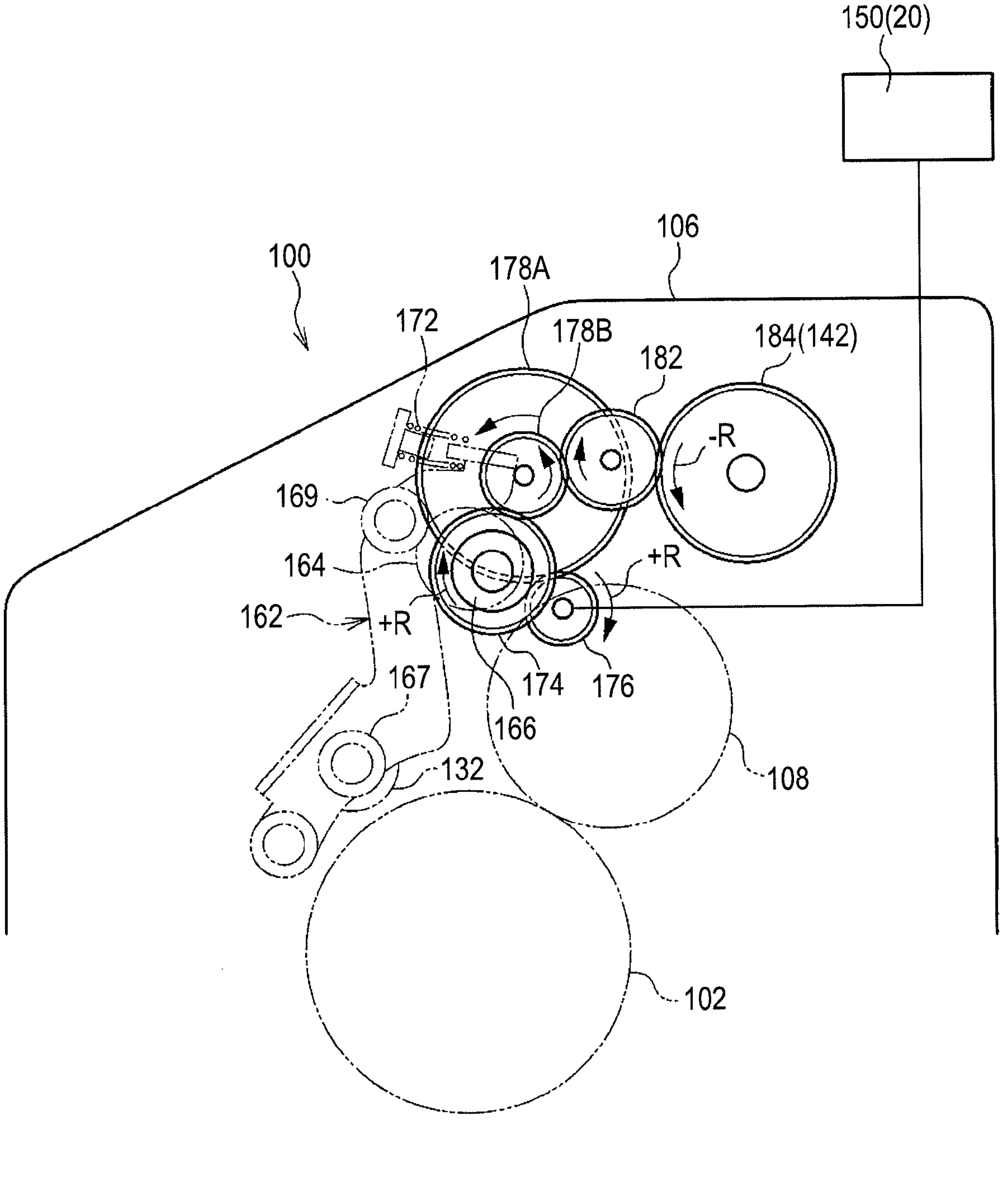
FIG. 6 is an explanatory diagram showing the rotational state of individual gears related to the first exemplary embodiment of the invention.

As shown in FIG. 6, the fixing device 100 has the motor 150 as an example of a common driving source that drives the refresh roll 132 and the external heating roll 108. The motor 150 has a pinion 176 and is adapted to perform the driving of rotating the pinion 176 in the direction of the arrow +R or the direction of the arrow −R on the basis of the instruction information from the control section 20. In addition, as an example, the motor 150 is adapted to rotate the pinion 176 in the direction of the arrow +R when the refresh roll 132 is brought into contact with or retracted from the fixing roll 102, and to rotate the pinion 176 in the direction of the arrow R when the external heating roll 108 is brought into contact with or retracted from the fixing roll 102.

An intermediate gear 178A rotatably provided with a preset number of teeth meshes with the pinion 176. The intermediate gear 178A is integrally molded with an intermediate gear 178B that is coaxially arranged with a smaller diameter than the intermediate gear 178A, and a transmission gear 182 that rotatably provided with a preset number of teeth meshes with the intermediate gear 178B. Also, a driving gear 184 of a preset number of teeth meshes with the outer periphery of the transmission gear 182 at a position different from the intermediate gear 178B. Moreover, the driving gear 184 is fixed to the eccentric cam 142 that operates the retracting mechanism 140 (refer to FIG. 4).

On the other hand, a driving gear 174 of a preset number of teeth meshes with the outer periphery of the intermediate gear 178B at a position different from the transmission gear 182. Also, the driving gear 174 is integrated with the one-way clutch 166, and when the driving gear 174 rotates in the direction of the arrow +R, the one-way clutch 166 is engaged by a driving force so as to transmit the driving force in the direction of the arrow +R to the cam 164. Additionally, when the driving gear 174 rotates in the direction of the arrow −R, the one-way clutch 166 is disengaged (transmission of the driving force is blocked), and the cam 164 idles.

Here, as shown in FIG. 6, when the pinion 176 rotates in the direction of the arrow +R, the intermediate gears 178A and 178B rotate in the direction of the arrow in the drawing, the driving gear 174 rotates in the direction of the arrow +R, and the cam 164 rotates in the direction of the arrow +R. At this time, the transmission gear 182 rotates in the direction of the arrow in the drawing, and the driving gear 184 rotates in the direction of the arrow −R. In addition, since the one-way clutch is not provided in the driving force transmission path to the eccentric cam 142 (refer to FIG. 4), the eccentric cam 142 rotates in the direction of the arrow −R.

On the other hand, when the pinion 176 rotates in the direction of the arrow −R, the intermediate gears 178A and 178B rotate in the direction opposite to the direction of the arrow in the drawing, and the driving gear 174 rotates in the direction of the arrow −R. Also, since the transmission of the driving force is blocked by the one-way clutch 166, the cam 164 does not rotate. Additionally, the transmission gear 182 rotates in the direction opposite to the direction of the arrow in the drawing, and the driving gear 184 rotates in the direction of the arrow +R. Thereby, the eccentric cam 142 rotates in the direction of the arrow +R, and the contact or retraction (retracting operation) of the external heating roll 108 with respect to the fixing roll 102 is performed.

In addition, as an example, the control section 20 (refer to FIG. 1) is set to switch the driving of the motor 150 so that the pinion 176 of the motor 150 is rotated in the direction of the arrow +R, and the driving force that moves the refresh roll 132 in the direction (refer to FIG. 5) of the arrow +D is applied to the one-way clutch 166 and the cam 164, and then, the pinion 176 is stopped when the refresh roll 132 comes into contact with the fixing roll 102, and subsequently the driving force in the opposite direction is applied to the driving gear 174.

The point in time when the rotational driving of the pinion 176 is stopped and switched to the direction of the arrow −R from the direction of the arrow +R is a point in time when the side (position where the cam has rotated by 180°) of the cam 164 opposite to the concave 164B (refer to FIG. 5) comes into contact with the follower 169, in other words, the time when the cam 164 comes into contact with the follower 169 on the side where the distance from the rotating shaft 164A to the outer peripheral surface is small. Additionally, the point in time when the side (position where the cam has rotated by 180°) of the cam 164 opposite to the concave 164B (refer to FIG. 5) comes into contact with the follower 169 is detected by a detection part (not shown) for position detection provided in the cam 164 by a rotational position detection unit (not shown), such as a rotary encoder.

(Operation)

Next, the operation of the first exemplary embodiment will be described.

Figure 7A:
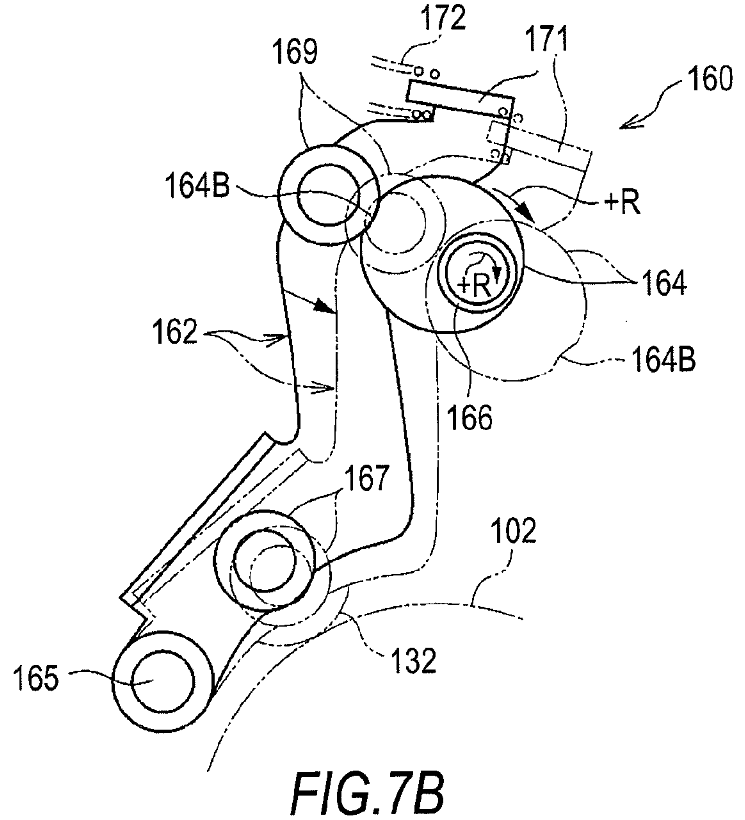
FIGS. 7A to 7C are schematic diagrams showing the movement state of a cam and a follower when the refresh roll is brought into contact with or retracted from the fixing roll, related to the first exemplary embodiment of invention.

The positions (shown by solid lines) of the individual members in a state where the refresh roll 132 has retracted from the outer periphery of the fixing roll 102, and the positions (shown by double-dotted chain lines) of the individual members in a state where the refresh roll 132 has come into contact with the outer periphery of the fixing roll 102 are shown in FIG. 7A. When the part of the cam 164 with the largest eccentricity comes into contact with the follower 169, the follower 169 comes into contact with the concave 164B of the cam 164, the supporting lever 162 moves against the elasticity force of the spring 172 via the follower 169, and the refresh roll 132 separates (retracts) from the outer periphery of the fixing roll 102.

On the other hand, when the part (side opposite to the concave 164B) of the cam 164 with the smallest eccentricity comes into contact with the follower 169, the follower 169 comes into contact with the part of the cam 164 with the smallest eccentricity by the elasticity force of the spring 172, the supporting lever 162 is moved by the elasticity force of the spring 172, and the refresh roll 132 comes into contact with the outer periphery of the fixing roll 102.

Here, in the driving mechanism 160, when the driving force in the direction of the arrow +R is transmitted to the one-way clutch 166 by the driving of the motor 150, the one-way clutch 166 is engaged by this driving force, and the driving force in the direction of the arrow +R is transmitted to the cam 164. Thereby, the cam 164 rotates in the direction of the arrow +R, the supporting lever 162 is reciprocated, and the refresh roll 132 is brought into contact with or retracted from the outer periphery of the fixing roll 102.

Figure 7B:
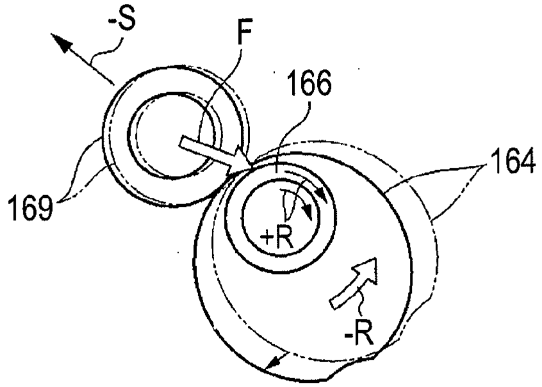

At this time, in a comparative example in which the cam 164 is rotated in the direction of the arrow +R, and the refresh roll 132 is only stopped at the contact position of the outer periphery of the fixing roll 102, movement of the one-way clutch 166 in the direction of the arrow +R is allowed, and movement of the one-way clutch in the direction of the arrow −R is locked (regulated). For this reason, as shown in FIG. 7B, when the cam 164 rotates in the direction of the arrow +R and the follower 169 comes into contact with the part of the cam 164 with the smallest eccentricity, the cam 164 is moved by the elasticity force F of the spring 172 (refer to FIG. 7A) so that the follower 169 rides on the slope of the outer periphery of the cam 164, and the cam 164 rotates to a position (shown by a solid line) where the cam has overrun in the direction of the arrow +R from an original setting position (shown by double-dotted chain line). Also, the follower 169 moves in a direction (this is described as the direction of an arrow −S) in which the refresh roll 132 (refer to FIG. 7A) retracts from the fixing roll 102, and the refresh roll 132 that should come into contact with the outer periphery of the fixing roll 102 may separate from the outer periphery of the fixing roll 102, or even if the refresh roll come into contact with the fixing roll, the pressurizing force of the refresh roll 132 with respect to the fixing roll 102 is insufficient. Thereby, the contact position (contact state) of the refresh roll 132 with respect to the fixing roll 102 becomes unstable.

Figure 7C:
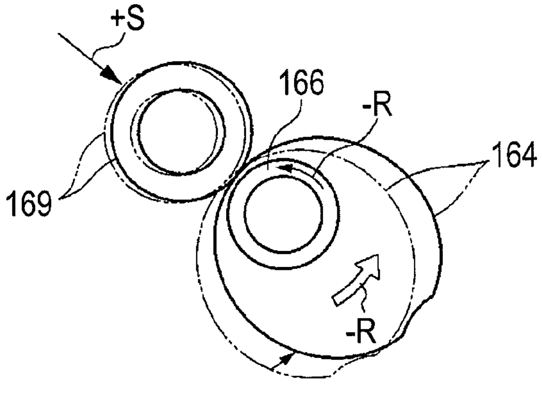

On the other hand, in the driving mechanism 160 of the present exemplary embodiment, when the cam 164 rotates in the direction of the arrow +R, the refresh roll 132 comes into contact with the outer peripheral surface of the fixing roll 102, and the follower 169 comes into contact with the part of the cam 164 with the smallest eccentricity, the pinion 176 (refer to FIG. 6) of the motor 150 rotates reversely (rotates in the direction of the arrow −R), and the driving force in the direction of the arrow −R is transmitted even to the one-way clutch 166. Here, as shown in FIG. 7C, since the transmission of the driving force from the one-way clutch 166 to the cam 164 is blocked, the cam 164 can rotate freely with respect to a drive system, and the supporting lever 162 (refer to FIG. 7A) returns to an original setting position (position of the follower 169 shown by a solid line) in the direction (an opposite direction to the direction of arrow −S) of the arrow +S by the elasticity force of the spring 172. Thereby, the follower 169 is settled at the original setting position, and the contact position (contact state) of the refresh roll 132 with respect to the fixing roll 102 is stabilized.

Additionally, as a comparative example, in FIGS. 4 and 5, in a case where the one-way clutch 166 is provided in the eccentric cam 142, the rotational direction (the direction of the arrow −R) that is brought into a free state by this one-way clutch 166 is present in the eccentric cam 142, and the pressurizing force by the springs 152 is large. Therefore, the eccentric cam 142 rotates rapidly in the direction of the arrow −R. For this reason, an abrupt contact of the external heating roll 108 cannot be stopped, and the eccentric cam 142 and the upper follower 143 or the lower follower 145 come into contact with each other, and a large striking noise is generated.

However, in the present exemplary embodiment, since the one-way clutch 166 is not provided in the eccentric cam 142 on the side of the external heating roll 108, the rotational direction in which the eccentric cam 142 is brought into a free state does not exist. For this reason, the rapid rotation of the eccentric cam 142 is suppressed, the abrupt contact of the external heating roll 108 is suppressed, and the generation of a large striking noise is suppressed.

Second Exemplary Embodiment

Next, an example of a driving mechanism, a fixing device, and an image forming apparatus related to a second exemplary embodiment of the invention will be described.

The image forming apparatus and fixing device of the second exemplary embodiment has mechanically the same configuration as the image forming apparatus 10 and fixing device 100 of the first exemplary embodiment mentioned above, and the second exemplary embodiment is different from the first exemplary embodiment in that rocking of the bracket 124 that supports the pressure roll 104 is performed by a driving mechanism 190. For this reason, the image forming apparatus and fixing device in the second exemplary embodiment are also described as the image forming apparatus 10 and the fixing device 100. Basically the same members as those of the image forming apparatus 10 and fixing device 100 of the first exemplary embodiment mentioned above are designated by the same reference numerals of the first exemplary embodiment, and the description thereof is omitted.

Figure 8:
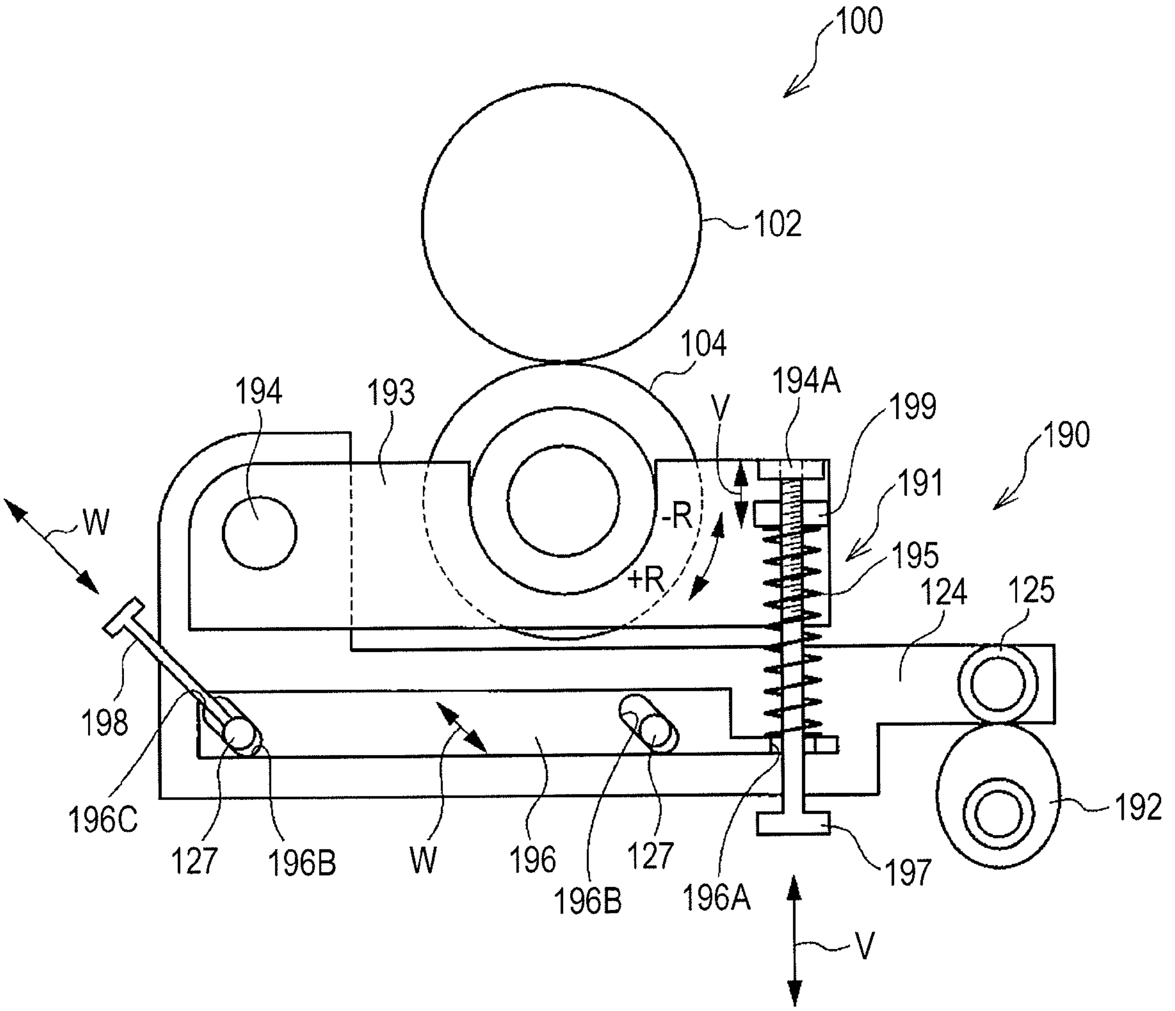
FIG. 8 is an explanatory diagram showing a driving mechanism of a pressure roll related to a second exemplary embodiment of the invention.

The driving mechanism 190 that rocks the bracket 124 provided in the fixing device 100 of the second exemplary embodiment is shown in the schematic diagram in FIG. 8. The driving mechanism 190 has the pressure roll 104 as an example of a contacting member that is brought into contact with or retracted from the fixing roll 102, a supporting mechanism part 191 as an example of a supporting member that supports the pressure roll 104, is reciprocatably provided, is pushed in a direction in which the pressure roll 104 comes into contact with the fixing roll 102, a cam 192 whose outer periphery is brought into contact with the follower 125 at the end of the bracket 124 and that reciprocates the pressure roll 104 with respect to the fixing roll 102 by rotating with a driving force, and the one-way clutch 166 that is provided in a driving gear 206 (refer to FIG. 9A) that drives the cam 192, is engaged by a driving force to transmit the driving force to the cam 192, and is disengaged by a driving force in an opposite direction.

The supporting mechanism part 191 includes an upper bracket 193 that rotatably supports the pressure roll 104 and is provided so as to be reciprocable in the direction of the arrow V about a rotating shaft 194 provided at a left end in the drawing, a bracket 124 that is provided so as to be reciprocable in the direction of the arrow V about the rotating shaft 194 independently from the upper bracket 193, a lower bracket 196 that is provided so as to be relatively movable in a negative slope direction (hereinafter referred to as the direction of an arrow W) in the drawing with respect to the bracket 124, a coiled compression spring 195 nipped and compressed by the upper bracket 193 and the lower bracket 196, and a first adjusting screw 197 and a second adjusting screw 198 that adjust the pushing force (pressurizing force) of the pressure roll 104 against the fixing roll 102.

A follower 125 that comes into contact with the cam 192 is rotatably held at the end of the bracket 124 opposite to the rotating shaft 194. Additionally, in the bracket 124, supporting pins 127 that protrude in the axial direction of the rotating shaft 194 are provided in two places with a distance from each other between the rotating shaft 194 and the follower 125 (central portion), and the lower bracket 196 is supported by the supporting pins 127. Also, the bracket 124 moves up and down in the direction of the arrow V about the rotating shaft 194 as the cam 192 rotates under the driving of the motor 150 (refer to FIG. 9A).

A screw holding portion 194A that protrudes in the shape of a flat plate in the same direction as the axial direction of the rotating shaft 194 is provided at the end of the upper bracket 193 opposite to the rotating shaft 194. The screw holding portion 194A has a through hole formed in the direction of the arrow V, and rotatably holds the tip of the first adjusting screw 197. Additionally, a tip portion of the first adjusting screw 197 is screwed into a nut 199 in which a female thread is formed, below the screw holding portion 194A. In addition, the first adjusting screw 197 is not coupled with the bracket 124 and the lower bracket 196.

A long hole 196B through which the supporting pins 127 of the bracket 124 are inserted is formed at a left end portion and a central portion of the lower bracket 196 with the right-and-left direction in the drawing as a longitudinal direction, and a right end portion of the lower bracket is formed with a through hole 196A through which the first adjusting screw 197 is inserted without contact. The long hole 196B is formed so that the long axis direction thereof becomes an inclining direction W. Additionally, a screw hole 196C connected with the long hole 196B on the left in the drawing is formed along the inclining direction W in the lower bracket 196, and a second adjusting screw 198 is screwed into the screw hole 196C. Also, the tip of the second adjusting screw 198 butts against the supporting pin 127 on the left in the drawing. Thereby, when the second adjusting screw 198 is rotated, the lower bracket 196 moves in the inclining direction W with respect to the bracket 124.

A compression spring 195 is nipped and compressed by the nut 199 and a right end portion of the lower bracket 196. Also, the amount of compression of the compression spring 195 is adjusted by positional adjustment of the nut 199 by the first adjusting screw 197, and positional adjustment of the lower bracket 196 by the second adjusting screw 198, and the pressurizing force of the pressure roll 104 with respect to the fixing roll 102 is adjusted.

Here, when the cam 192 pushes up the follower 125 and the bracket 124, the bracket 124 compresses the compression spring 195 via the lower bracket 196. The repelling force against the compression of the compression spring 195 is received by the nut 199 and transmitted to the screw holding portion 194A. With this force, the upper bracket 193 pressurizes the pressure roll 104 toward the fixing roll 102.

Next, transmission of a driving force of the pressure roll 104 and decurler 39 will be described.

Figure 9A:
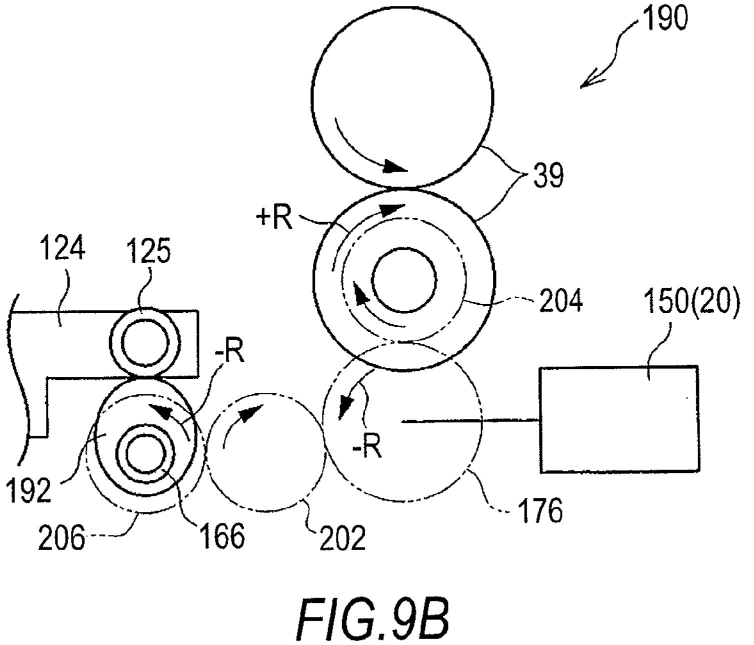
FIG. 9A is an explanatory diagram showing the rotational state of individual gears when a gear on the side of a decurler is rotated in the direction of +R, related to the second exemplary embodiment of the invention.

As shown in FIG. 9A, the fixing device 100 of the second exemplary embodiment has, as an example, the motor 150 as an example of a common driving source that drives the pressure roll 104 (refer to FIG. 8), and a lower roll of the decurler 39. The motor 150 has the pinion 176 and is adapted to perform the driving of rotating the pinion 176 in the direction of the arrow +R or the direction of the arrow −R on the basis of the instruction information from the control section 20. In addition, as an example, the motor 150 is adapted to rotate the pinion 176 in the direction of the arrow +R when the pressure roll 104 is brought into contact with the fixing roll 102, and to rotate the pinion 176 in the direction of the arrow −R when the decurler 39 is rotated.

A driving gear 204 is rotatably provided with a preset number of teeth meshes with the pinion 176. The driving gear 204 is fixed to the rotating shaft of the lower roll of one pair of upper and lower rolls that constitute the decurler 39.

On the other hand, an intermediate gear 202 with a preset number of teeth meshes with the outer periphery of the pinion 176 at a position different from the driving gear 204, and a driving gear 206 rotatably provided with a preset number of teeth meshes with the intermediate gear 202 at a position different from the meshing position of the intermediate gear with the pinion 176. The driving gear 206 is integrated with the one-way clutch 166, and is provided on the rotating shaft of the cam 192. Also, when the driving gear 206 rotates in the direction of the arrow +R, the one-way clutch 166 is engaged by a driving force so as to transmit the driving force in the direction of the arrow +R to the cam 192. Additionally, when the driving gear 206 rotates in the direction of the arrow −R, the one-way clutch 166 is disengaged (transmission of the driving force is blocked), and the cam 192 idles.

Here, when the pinion 176 rotates in the direction of the arrow −R, the driving gear 204 rotates in the direction of the arrow in the drawing, and the decurler 39 (lower) rotates in the direction of the arrow +R. At this time, although the intermediate gear 202 rotates in the direction of the arrow in the drawing and the driving gear 206 rotates in the direction of the arrow −R, since transmission of driving is blocked by the one-way clutch 166, the cam 192 does not rotate.

On the other hand, when the pinion 176 rotates in the direction of the arrow +R, the intermediate gear 202 rotates in the direction of the arrow −R, and the driving gear 206 rotates in the direction of the arrow +R. Also, since a driving force is transmitted by the one-way clutch 166, the cam 192 rotates in the direction of the arrow +R. In addition, although the driving gear 204 rotates in the direction of the arrow −R, since the one-way clutch is not provided in the driving force transmission path to the decurler 39, the decurler 39 rotates in the direction of the arrow −R.

In addition, as an example, the control section 20 (refer to FIG. 1) is set to switch the driving of the motor 150 so that the pinion 176 of the motor 150 is rotated in the direction of the arrow +R, the driving force by which the pressure roll 104 is brought into contact with or retracted from the fixing roll 102 is applied to the one-way clutch 166 and the cam 192, and then, the pinion 176 is stopped when the pressure roll 104 retracts from the fixing roll 102 (when the follower 125 comes into contact with the side where the distance from the rotating shaft of the cam 192 to the outer peripheral surface thereof is small), and subsequently, the driving force in the opposite direction is applied to the driving gear 206. In addition, the cam 192 is provided with a detection part for position detection (not shown), and this detection part is detected by a rotational position detection unit (not shown), such as a rotary encoder, so that the rotational position of the cam 192 is obtained and the switching time of the driving of the motor 150 is determined.

(Operation)

The operation of the second exemplary embodiment will be described.

In FIG. 9A, in the driving mechanism 190 of the second exemplary embodiment, when the driving force in the direction of the arrow +R is transmitted to the one-way clutch 166 by the driving (driving of rotating the pinion 176 in the direction of the arrow +R) of the motor 150, the one-way clutch 166 is engaged by this driving force, and the driving force in the direction of the arrow +R is transmitted to the cam 192. Thereby, the cam 192 rotates in the direction of the arrow +R, the bracket 124 is reciprocated, and the pressure roll 104 (refer to FIG. 9) is brought into contact with or retracted from the outer periphery of the fixing roll 102.

Figure 9B:
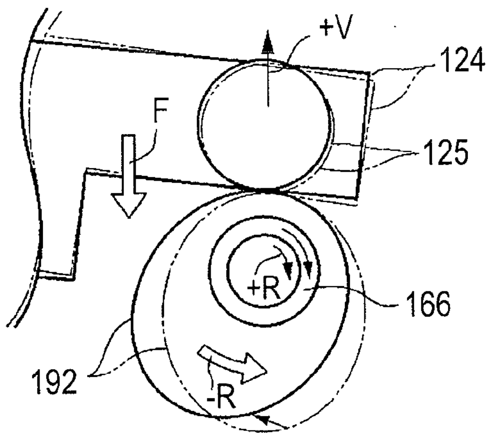
FIGS. 9B and 9C are schematic diagrams showing the movement state of a cam and a follower, related to the second exemplary embodiment of invention.

At this time, in a comparative example in which the cam 192 is rotated in the direction of the arrow +R, and the pressure roll 104 is only stopped at the contact position of the outer periphery of the fixing roll 102, movement of the one-way clutch 166 in the direction of the arrow +R is allowed, and movement of the one-way clutch in the direction of the arrow −R is locked (regulated). For this reason, as shown in FIG. 9B, when the cam 192 rotates in the direction of the arrow +R and the follower 125 comes into contact with the part (the side where the distance from the rotating shaft to the outer peripheral surface is small) of the cam 192 with the smallest eccentricity, the cam 192 is pushed by the pushing force F including the weight of the bracket 124 so that the follower 125 rides on the slope of the outer periphery of the cam 192, and the cam 192 rotates to a position (shown by a solid line) where the cam has overrun in the direction of the arrow +R from an original setting position (shown by double-dotted chain line). Also, the follower 125 moves in a direction (direction of the arrow +V) in which the pressure roll 104 (refer to FIG. 8) comes into contact with the fixing roll 102, and the pressure roll 104 that should retract from the outer periphery of the fixing roll 102 may approach or come into contact with the outer periphery of the fixing roll 102, and the contact position (contact state) of the pressure roll 104 with respect to the fixing roll 102 becomes unstable.

Figure 9C:
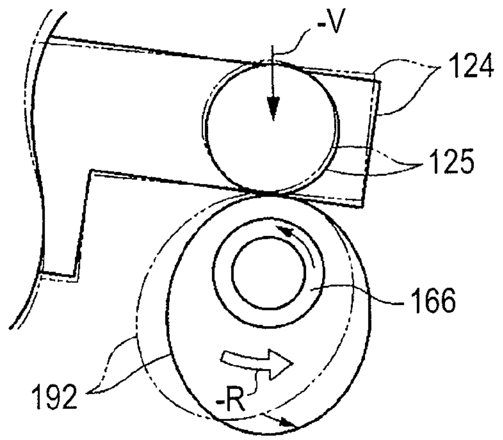

On the other hand, in FIG. 9A, in the driving mechanism 190 of the present exemplary embodiment, when the cam 192 rotates in the direction of the arrow +R, the follower 125 comes into contact with the part of the cam 192 with the smallest eccentricity, the pinion 176 of the motor 150 rotates reversely (rotates in the direction of the arrow −R), and the driving force in the direction of the arrow −R is transmitted even to the one-way clutch 166. Here, as shown in FIG. 9C, since the transmission of the driving force from the one-way clutch 166 to the cam 192 is blocked, the cam 192 can rotate freely with respect to a drive system, and the bracket 124 returns to an original setting position (position shown by a solid line) by the pushing force including the weight of the bracket 124 itself. Thereby, the retraction position (retraction state) of the pressure roll 104 with respect to the fixing roll 102 is stabilized.

In addition, the invention is not limited to the above exemplary embodiments.

The fixing roll 102 may be a fixing belt heated by an electromagnetic induction method. Additionally, the driving mechanisms 160 and 190 are not only applied to the refresh roll 132 and the pressure roll 104, but may also be applied to the driving of a paper feed roll, a transfer roll, a cleaning blade, and the like. In addition, as an ideal state when the refresh roll 132 comes into contact with the outer periphery of the fixing roll 102, it is desirable that the cam 164 and the follower 169 are brought into a non-contact state.

Additionally, when the pressurizing force of the spring 172 is larger than the pressurizing force of the springs 152, the one-way clutch 166 may be provided not on the refresh roll 132 but on the external heating roll 108.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular uses contemplated. It is intended that the scope of the invention is defined by the following claims and their equivalents.

What is claimed is:

1. A driving mechanism comprising:

a first contacting member that comes into contact with a contacted member;

a supporting member that supports the first contacting member and is reciprocatably provided, the supporting member moving the first contacting member into contact with or retracting from the contacted member;

a cam that reciprocates the supporting member; and a driving force transmission member that is provided to transmit a first driving force to the cam, the driving force transmission member is engaged with the cam when transmitting the first driving force, and is disengaged from the cam when receiving a second driving force; and a driving member that transmits the first driving force and the second driving force to the driving force transmission member and that rotates in a first direction and a second direction, the first direction being opposite to the second direction, wherein the second driving force is applied to the driving force transmission member after the cam is stopped in a state where the cam comes into contact with the supporting member on a small radius end of the cam, wherein the contact member moves when the second driving force is applied to the cam.

2. The driving mechanism according to claim 1, wherein the supporting member is pushed so that the first contacting member contacts with the contacted member.

3. The driving mechanism according to claim 1, wherein the cam is connected to a one-way clutch.

4. The driving mechanism according to claim 1, wherein the cam having a concave portion on a large radius end portion of the cam.

5. A fixing device comprising:

a fixing member that rotates and fixing a toner image to a recording medium, a first contacting member that comes into contact with the fixing member;

a supporting member that supports the first contacting member and is reciprocatably provided, the supporting member moving the first contacting member into contact with or retracting from the fixing member;

a cam that reciprocates the supporting member; and a driving force transmission member that is provided to transmit a first driving force to the cam, the driving force transmission member is engaged with the cam when transmitting the first driving force, and is disengaged from the cam when receiving a second driving force; and a driving member that transmits the first driving force and the second driving force to the driving force transmission member and that rotates in a first direction and a second direction, the first direction being opposite to the second direction, wherein the second driving force is applied to the driving force transmission member after the cam is stopped in a state where the cam comes into contact with the supporting member on a small radius end of the cam, wherein the contact member moves when the second driving force is applied to the cam.

6. The fixing device according to claim 5, wherein the first contacting member is brought into contact with or retracted from the fixing member with the first driving force transmitted from a driving source, and a second contacting member is provided so as to be brought into contact with or retracted from the fixing member with at least the second driving force transmitted from the driving source.

7. The fixing device according to claim 6, wherein the second contacting member is pressed toward the fixing member by a force greater than a force pressing the first contacting member toward the fixing member, and the second contacting member reciprocates by the first driving force or the second driving force.

8. The fixing device according to claim 6, wherein the first contacting member is a roughening member that roughens an outer peripheral surface of the fixing member.

9. The fixing device according to claim 6, wherein the second contacting member is an external heating member that heats an outer peripheral surface of the fixing member.

10. The fixing device according to claim 5, wherein the cam is connected to a one-way clutch.

11. The fixing device according to claim 5, wherein the cam having a concave portion on a large radius end portion of the cam.

12. An image forming apparatus comprising:

a developer image forming unit that forms a developer image;

a transfer unit that transfers the developer image to a recording medium; and a fixing device including:

a fixing member that rotating and fixing the developer image to the recording medium, a first contacting member that comes into contact with a fixing member;

a supporting member that supports the first contacting member and is reciprocatably provided, the supporting member bring the first contacting member into contact with or retracting from the fixing member;

a cam that reciprocates the supporting member;

a driving force transmission member that is provided to transmit a first driving force to the cam, and the driving force transmission member is engaged when transmitting the first driving force, and is disengaged from the cam when receiving a second driving force; and a driving member that transmits the first driving force and the second driving force to the driving force transmission member and that rotates in a first direction and a second direction, the first direction being opposite to the second direction, wherein the second driving force is applied to the driving force transmission member after the cam is stopped in a state where the cam comes into contact with the supporting member on a small radius end of the cam, wherein the contact member moves when the second driving force is applied to the cam.

13. The image forming apparatus according to claim 12, wherein the first contacting member is brought into contact with or retracted from the fixing member with the first driving force transmitted from a driving source, and a second contacting member is provided so as to be brought into contact with or retracted from the fixing member with at least the second driving force transmitted from the driving source.

14. The image forming apparatus according to claim 13, wherein the second contacting member is pressed toward the fixing member by a force greater than a force pressing the first contacting member toward the fixing member, and the second contacting member reciprocates by the first driving force or the second driving force.

15. The image forming apparatus according to claim 13, wherein the first contacting member is a roughening member that roughens an outer peripheral surface of the fixing member.

16. The image forming apparatus according to claim 13, wherein the second contacting member is an external heating member that heats an outer peripheral surface of the fixing member.

17. The image forming apparatus according to claim 12, wherein the cam is connected to a one-way clutch.

18. The image forming apparatus according to claim 12, wherein the cam having a concave portion on a large radius end portion of the cam.

* * * * *